US007992090B2

(12) United States Patent
Bates et al.

(10) Patent No.: US 7,992,090 B2
(45) Date of Patent: Aug. 2, 2011

(54) RECIPROCAL LINK TRACKING

(75) Inventors: Cary Lee Bates, Rochester, MN (US); Paul W. Buenger, Eau Claire, WI (US)

(73) Assignee: International Business Machines Corporation, Armonk, NY (US)

( * ) Notice: Subject to any disclaimer, the term of this patent is extended or adjusted under 35 U.S.C. 154(b) by 2495 days.

(21) Appl. No.: 10/671,407

(22) Filed: Sep. 25, 2003

(65) Prior Publication Data

US 2005/0071478 A1 Mar. 31, 2005

(51) Int. Cl.
*G06F 3/00* (2006.01)
(52) U.S. Cl. ......... 715/760; 715/234; 715/733; 715/764
(58) Field of Classification Search .................. 709/228; 715/234, 733, 760, 764
See application file for complete search history.

(56) References Cited

U.S. PATENT DOCUMENTS

| | | | | |
|---|---|---|---|---|
| 5,761,683 A * | 6/1998 | Logan et al. | | 715/513 |
| 5,995,099 A * | 11/1999 | Horstmann | | 715/501.1 |
| 6,144,962 A * | 11/2000 | Weinberg et al. | | 707/10 |
| 6,253,198 B1 * | 6/2001 | Perkins | | 707/3 |
| 6,351,738 B1 * | 2/2002 | Clark | | 705/37 |
| 6,360,222 B1 * | 3/2002 | Quinn | | 707/100 |
| 6,487,600 B1 * | 11/2002 | Lynch | | 709/229 |
| 6,771,291 B1 * | 8/2004 | DiStefano, III | | 715/762 |
| 6,823,379 B1 * | 11/2004 | Heckel et al. | | 709/224 |
| 6,993,572 B2 * | 1/2006 | Ross et al. | | 709/218 |
| 7,028,031 B1 * | 4/2006 | Rehfeld | | 707/8 |
| 7,058,024 B1 * | 6/2006 | Koay | | 370/255 |
| 7,072,853 B2 * | 7/2006 | Shkedi | | 705/14 |
| 7,076,497 B2 * | 7/2006 | Donteverde | | 707/102 |
| 7,082,470 B1 * | 7/2006 | Lesser | | 709/232 |
| 7,162,508 B2 * | 1/2007 | Messina | | 709/200 |
| 2002/0078095 A1 * | 6/2002 | Culham | | 707/516 |
| 2002/0083093 A1 * | 6/2002 | Goodisman et al. | | 707/511 |
| 2002/0099723 A1 * | 7/2002 | Garcia-Chiesa | | 707/200 |
| 2003/0061219 A1 * | 3/2003 | Monteverde | | 707/10 |
| 2003/0084167 A1 * | 5/2003 | Dweck | | 709/228 |
| 2003/0195901 A1 * | 10/2003 | Shin et al. | | 707/104.1 |
| 2003/0204502 A1 * | 10/2003 | Tomlin et al. | | 707/5 |
| 2004/0111166 A1 * | 6/2004 | Jartyn | | 700/2 |
| 2004/0143600 A1 * | 7/2004 | Musgrove et al. | | 707/104.1 |
| 2004/0148366 A1 * | 7/2004 | Ross et al. | | 709/218 |
| 2004/0167931 A1 * | 8/2004 | Han | | 707/104.1 |
| 2004/0172415 A1 * | 9/2004 | Messina et al. | | 707/104.1 |
| 2006/0004748 A1 * | 1/2006 | Ramarathnam et al. | | 707/6 |

(Continued)

OTHER PUBLICATIONS

Microsoft Computer Dictionary 5th Edition, pp. 260-261.*

(Continued)

*Primary Examiner* — Tuyetlien T Tran
(74) *Attorney, Agent, or Firm* — Owen J. Gamon

(57) ABSTRACT

A method, apparatus, system, and signal-bearing medium that in an embodiment verify that if a selected first link in a first page points to a reciprocal site, then a reciprocal link in a reciprocal page points back to the first page. The verification is performed by finding the reciprocal page and searching it for the reciprocal link. If the reciprocal link does not exist, then in various embodiments, the first link is removed or is removed after a time period has elapsed or a number of times has been exceeded, or a user is warned of the lack of the reciprocal link. In this way, reciprocal links are tracked to verify that the first page is receiving the agreed-upon links.

17 Claims, 8 Drawing Sheets

U.S. PATENT DOCUMENTS

2006/0106623 A1* 5/2006 Lebaschi ............... 705/1
2006/0168006 A1* 7/2006 Shannon et al. ......... 709/206
2006/0218168 A1* 9/2006 Na et al. .............. 707/101

OTHER PUBLICATIONS

Axandra.com et al. "Arelis online user guide" May 2003.*
www.w3schools.com et al. "HTML tag list". http://www.w3schools.com/html/html_quick.asp, 2008.*
www.w3c.org et al. "HTML 4.0 specification", http://www.w3.org/TR/html401/cover.html, 1998.*
www.marketingterms.com et al. Reciprocal Link Definition http://web.archive.org/web/20011109022245/http://www.marketingterms.com/dictionary/reciprocal_link.*

* cited by examiner

RECIPROCAL LINK TRACKING

FIELD

This invention generally relates to computers and more specifically relates to web page development with reciprocal link tracking.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs.

One important use of computer systems is to access information in networks, such as the Internet. In order to find desired information on the Internet, users typically enter keywords into a search engine, which searches the millions of pages that make up the Internet and returns a list of pages that are relevant to or contain instances of the entered keywords.

Since hundreds or even thousands of pages may contain the entered keywords, the search engine needs a way to sort the returned pages, so that the pages most likely to be relevant or useful are presented to the user first. One popular technique for determining the relevance or importance of a returned page for sorting purposes is to count the number of other pages that contain a link or a pointer to the returned page. The theory behind this link-counting strategy is that if a page is a recognized authority, particularly well-designed, or especially helpful, many other pages in the Internet will contain links to it, so it deserves to be high in the returned list of pages.

Publishers of pages are very aware of this link-counting technique used by typical search engines, so they often agree with each other to link to one another's pages, in order to increase the number of times that their own pages are linked to, thus increasing their ranking in the search engine's sorted list. For example, a mortgage lender might add links in its page to the pages of real estate agents in exchange for the real estate agents adding reciprocal links on their pages to the mortgage lender.

A problem occurs when an agreement has been made to exchange reciprocal links, but one of the parties has failed (either intentionally or unintentionally) to keep its part of the bargain by either not adding the reciprocal link to its page, by removing the reciprocal link from its page, or by deleting the page entirely that contained the reciprocal link. Since publishers of pages often modify and reorganize their pages, it is common for them to inadvertently remove a reciprocal link or for the person modifying the page to be unaware of the requirement for a reciprocal link.

Without a better way to track and handle reciprocal links, users will continue to encounter difficulty in ensuring that their pages are linked to by an agreed-upon reciprocal link.

SUMMARY

A method, apparatus, system, and signal-bearing medium are provided that in an embodiment verify that if a selected first link in a first page points to a reciprocal site, then a reciprocal link in a reciprocal page points back to the first page. The verification is performed by finding the reciprocal page and searching it for the reciprocal link. If the reciprocal link does not exist, then in various embodiments, the first link is removed or is removed after a time period has elapsed or a number of times has been exceeded, or a user is warned of the lack of the reciprocal link. In this way, reciprocal links are tracked to verify that the first page is receiving the agreed-upon links.

DETAILED DESCRIPTION

Figure 1:
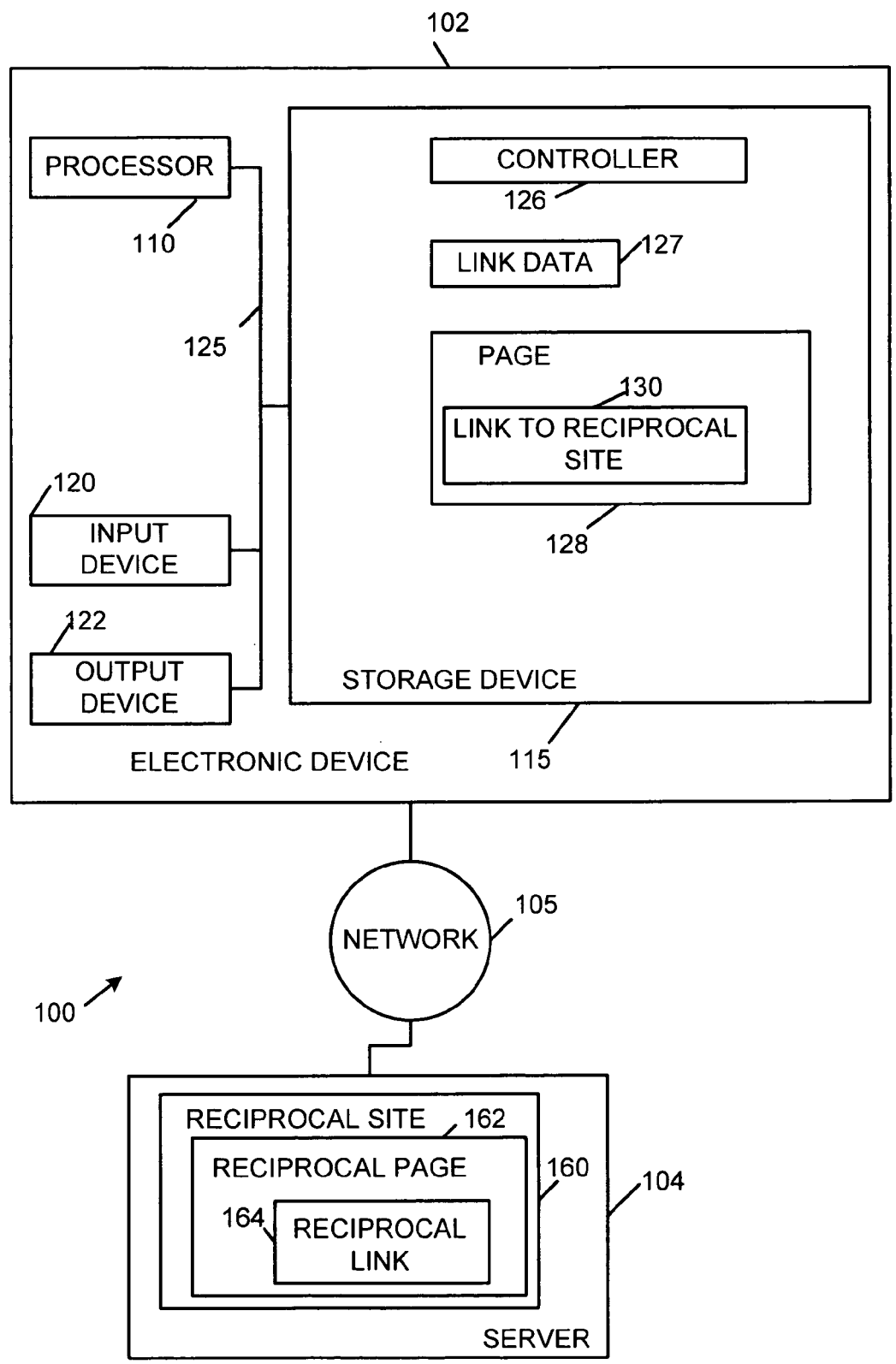
FIG. 1 depicts a block diagram of an example system for implementing an embodiment of the invention.

Referring to the Drawing, wherein like numbers denote like parts throughout the several views, FIG. 1 depicts a block diagram of an example system 100 for implementing an embodiment of the invention. The system 100 includes an electronic device 102 connected to a server 104 via a network 105. Although only one electronic device 102, one server 104, and one network 105 are shown, in other embodiments any number or combination of them may be present. Although the electronic device 102, the server 104, and the network 105 are illustrated in FIG. 1 as being discrete, separate components, in other embodiments some or all of their functions and elements may be combined.

In an embodiment, the electronic device 102 functions as a client that sends requests to and receives responses from the network 105. In another embodiment, the electronic device 102 functions as a server that receives requests from and sends responses to the network 105. The electronic device 102 includes a processor 110, a storage device 115, an input device 120, and an output device 122, all connected directly or indirectly via a bus 125.

The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122. Although the electronic device 102 is drawn to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Although the storage device 115 is shown in FIG. 1 as a single monolithic entity, the storage device 115 may in fact be distributed and/or hierarchical, as is known in the art. For example, the storage device 115 may exist in multiple levels of storage devices, and these levels of storage devices may be further divided by function, so that one level of storage device holds, e.g., instructions while another holds, e.g., non-instruction data which is used by the processor or processors. The storage device 115 may further be distributed and associated with different processors or sets of processors, as is known in any of various so-called non-uniform memory access (NUMA) computer architectures. Further, although the electronic device 102 is drawn to contain the storage device 115, it may be distributed across other electronic devices, such as electronic devices connected to the network 105.

The storage device 115 includes a controller 126, link data 127, and a page 128, all of which may in various embodiments have any number of instances. Although the controller 126, the link data 127, and the page 128 are all illustrated as being contained within the storage device 115 in the electronic device 102, in other embodiments some or all of them may be on different electronic devices and may be accessed remotely, e.g., via the network 105.

The controller 126 creates and publishes the page 128 and creates and monitors reciprocal links (via the link data 127) between the page 128 and pages on other electronic devices connected to the network 105, such as the server 104. In an embodiment, the controller 126 is implemented via an integrated development environment (IDE). In another embodiment, the controller 126 is implemented via a page editor. In another embodiment, the controller 126 is implemented via a browser. In an embodiment, the controller 126 includes instructions capable of executing on the processor 110 or statements capable of being interpreted by instructions executing on the processor 110 to present the user interface as further described below with reference to FIGS. 2A and 3, to create and manipulate the page 128 as further described below with reference to FIG. 2B, to create and manipulate the link data 127 as further described below with reference to FIG. 4, and to perform the functions as further described below with reference to FIGS. 5, 6, and 7. In another embodiment, the controller 126 may be implemented in hardware via logic gates and/or other appropriate hardware techniques in lieu of or in addition to a processor-based system.

The page 128 includes control tags and data that are capable of being rendered by the controller 126 to create images for display on an output device, such as the output device 122. The page 128 may be capable of being accessed by a browser for rendering and display on the output device 122 or on an output device on any other appropriate electronic device connected to the network 105. In an embodiment, the page 128 is encoded in HTML (Hypertext Markup Language), but in other embodiments, the page 128 be encoded via any appropriate markup language. The page 128 includes a link 130 to a reciprocal site, which is further described below with reference to FIGS. 2A and 2B.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102, such as the user interfaces further described below with reference to FIGS. 2A and 3. Although only one input device 120 is shown, in another embodiment any number and type of input devices may be present.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interfaces of the electronic device 102, such as the user interfaces further described below with reference to FIGS. 2A and 3.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller). Although the bus 125 is shown in FIG. 1 as a relatively simple, single bus structure providing a direct communication path among the processor 110, the storage device 115, the input device 120, and the output device 122, in other embodiments the bus 125 may comprise multiple different buses or communication paths, which may be arranged in any of various forms, such as point-to-point links in hierarchical, star or web configurations, multiple hierarchical buses, or parallel and redundant paths. Furthermore, while the bus 125 is shown directly connected to the processor 110, the storage device 115, the input device 120, and the output device 122, in other embodiments, some or all of the I/O (Input/Output) devices may be connected via I/O processors.

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The server 104 may be an electronic device including hardware and optional software components analogous to the electronic device 102 previously described above. The server 104 may receive requests from, send responses to, send requests to, and/or receive responses from the network 105. The server includes a reciprocal site 160, which includes a reciprocal page 162, which includes a reciprocal link 164. In another embodiment the reciprocal site 160 and the reciprocal page 162 are identical. Although only one page 162 is illustrated as being part of the reciprocal site 160, in other embodiments, the reciprocal site 160 may include any number of pages. The reciprocal link 164 links or points to the page 128, as further described below with reference to FIG. 2C. The link 130 links or points to the reciprocal site 160 (or in another embodiment to the reciprocal page 162). Thus, the links 130 and 164 are reciprocal.

The network 105 may be any suitable network or combination of networks and may support any appropriate protocol suitable for communication of data and/or code to/from the electronic device 102 and/or between the electronic device 102 and the server 104. In various embodiments, the network 105 may represent a storage device or a combination of storage devices, either connected directly or indirectly to the electronic device 102 and the server 104. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be a FRS (Family Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device 102 to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
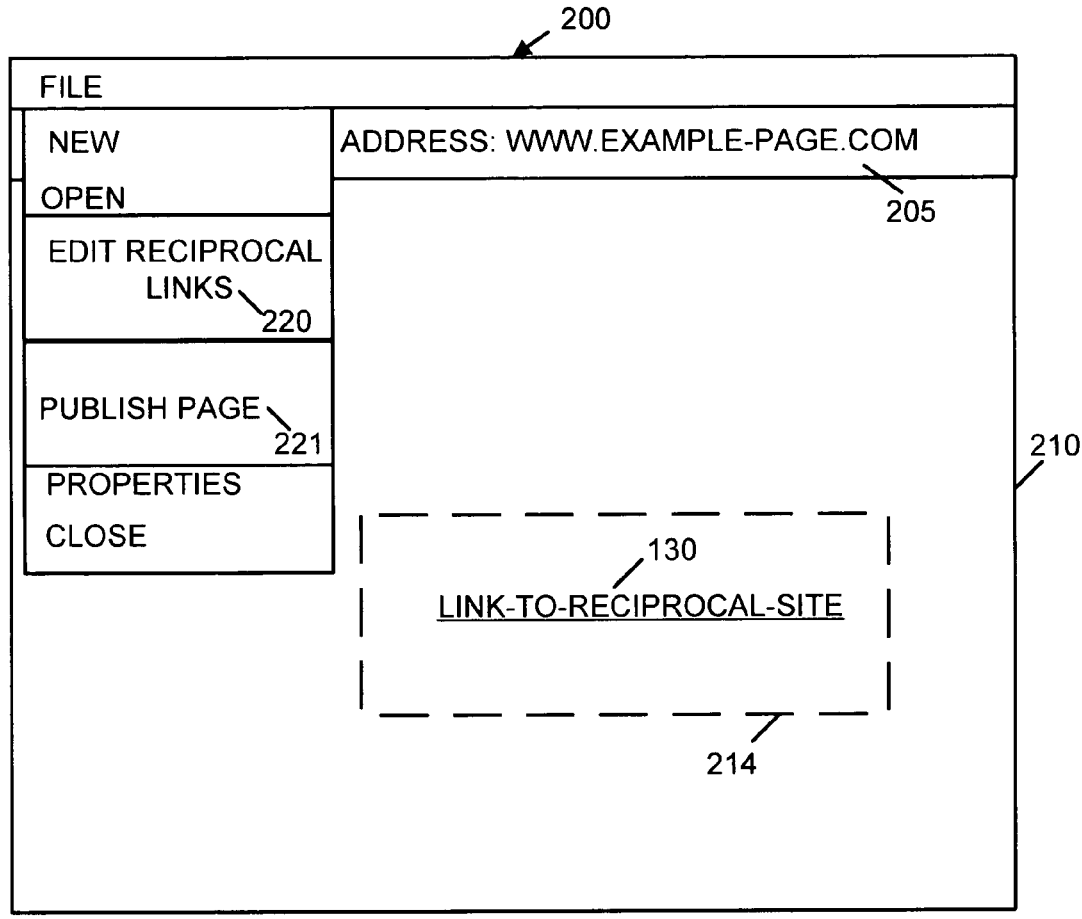
FIG. 2A depicts a pictorial representation of an example user interface, according to an embodiment of the invention.

FIG. 2A depicts a pictorial representation of an example user interface 200, according to an embodiment of the invention. The controller 126 may present the user interface 200 via the output device 122. The user interface 200 includes a displayed rendering 210 of the page 128, an address 205 of the page 128 (FIG. 1), an edit reciprocal link option 220 and a publish page option 221. The controller 126 publishes and/or retrieves the page 128 to/from the address 205 and renders the page 128 for display on the output device 122 in the displayed rendering 210. The displayed rendering 210 of the page 128 includes a selected section 214 containing a link 130 to the reciprocal site 160. When the user selects the section 214 (via the input device 120) in the displayed rendering 210 that includes the link 130 and selects the edit reciprocal links option 220, the controller 126 displays a dialog as further described below with reference to FIG. 3. When the user selects the publish page option 221, the controller 126 performs the processing as further described below with reference to FIG. 6. When a user selects the link 130, the controller 126 or a browser accesses the address associated with the link 130, and retrieves and renders the page associated with the link 130, which in this example is the home page at the reciprocal site 160.

Figure 2B:
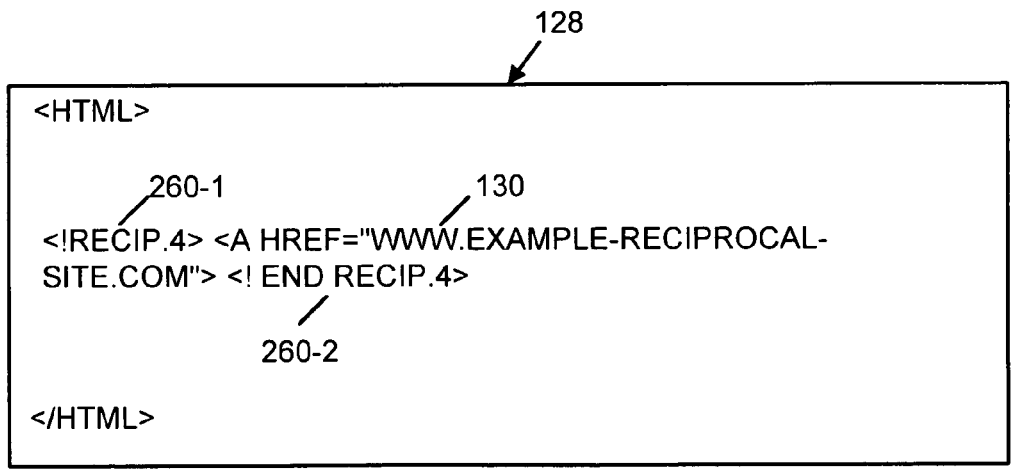
FIG. 2B depicts a pictorial representation of an example page, according to an embodiment of the invention.

FIG. 2B depicts a pictorial representation of example control tags and data in the page 128, according to an embodiment of the invention. The page 128 includes the link 130 to the reciprocal site 160. In the example shown, the link is encoded as an anchor tag in HTML, but any appropriate markup language may be used, and the reciprocal site 160 has the URL (Universal Resource Locator) of "www.example-reciprocal-site.com," but in other embodiments any appropriate link, address, or pointer may be used.

The link 130 is surrounded by a set of reciprocal tags 260-1 and 260-2, which the controller 126 creates in response to the option 220 as previously described above with reference to FIG. 2A and as further described below with reference to FIG. 5. In the example shown, the reciprocal tags 260-1 and 260-2 are encoded as comment tags, but in other embodiments any appropriate tags may be used. The reciprocal tags 260-1 and 260-2 include an unique identifier of the section 214, which in this example is "4," but in other embodiments any appropriate identifier may be used.

Figure 2C:
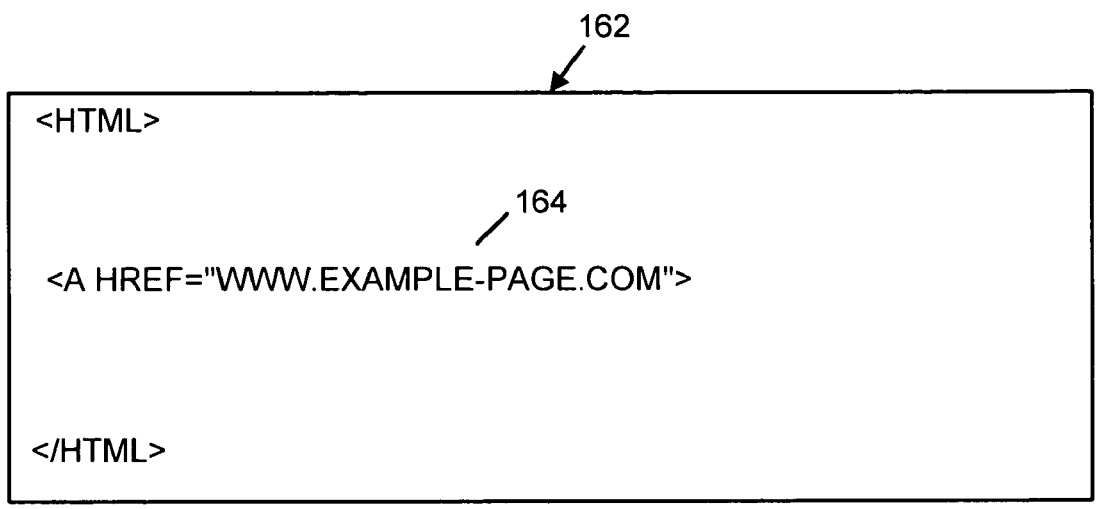
FIG. 2C depicts a pictorial representation of an example reciprocal page, according to an embodiment of the invention.

FIG. 2C depicts a pictorial representation of an example reciprocal page 162, according to an embodiment of the invention. The reciprocal page 162 includes the reciprocal link 164, which links to, points at, or otherwise includes the address of the page 128.

Figure 3:
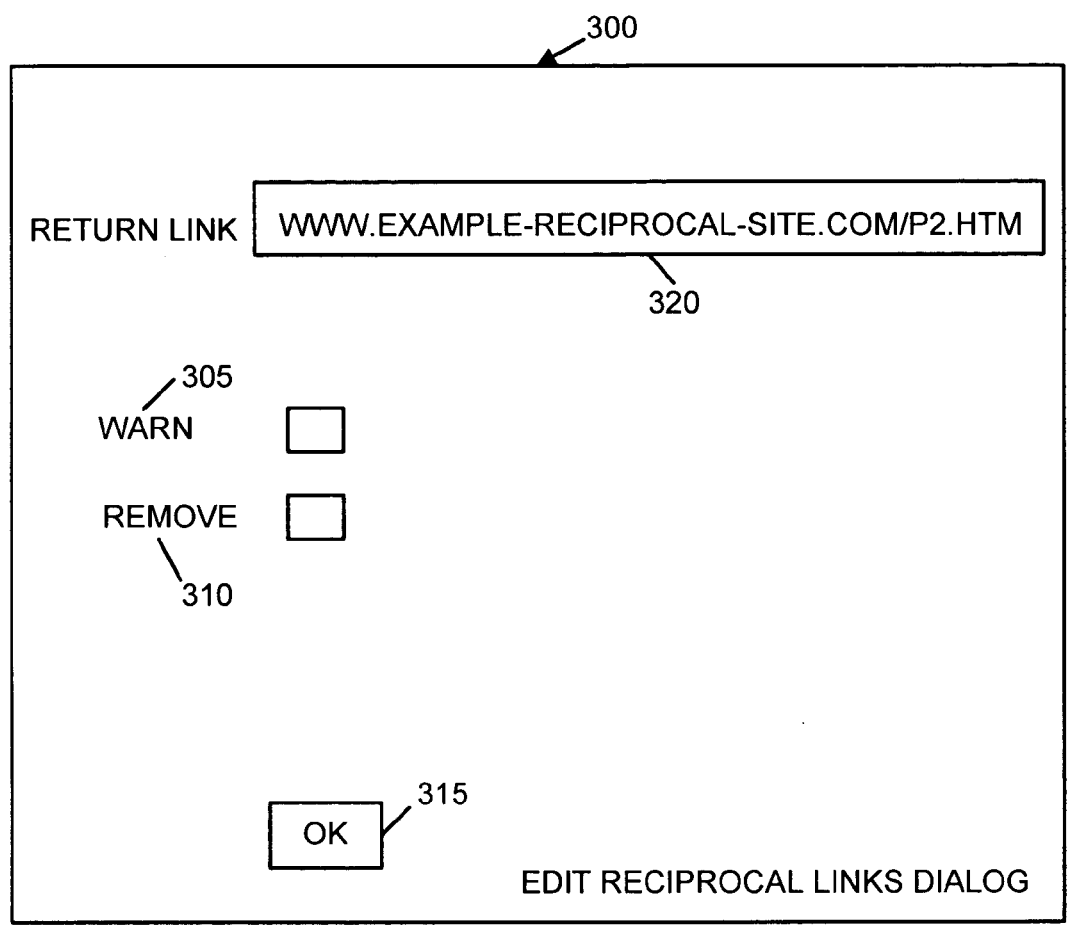
FIG. 3 depicts a pictorial representation of an example user interface dialog, according to an embodiment of the invention.

FIG. 3 depicts a pictorial representation of an example user interface dialog 300 displayed via the output device 122, according to an embodiment of the invention. The controller 126 displays the dialog 300 in response to the selection of the option 220 by the user. The dialog 300 includes a return link 320, which may be entered by the user via the input device 120. The dialog 300 also includes a warn option 305 and a remove option 310, one of which may be selected by the user via the input device 120. After the user enters the return link 320, selects one of the warn option 305 and the remove option 310, and selects the OK button 315, the logic of FIG. 5 is invoked, as further described below. The return link 320 is the link or pointer to the reciprocal page 162, which in various embodiments may be identical to or different from the reciprocal site 160.

Figure 4:
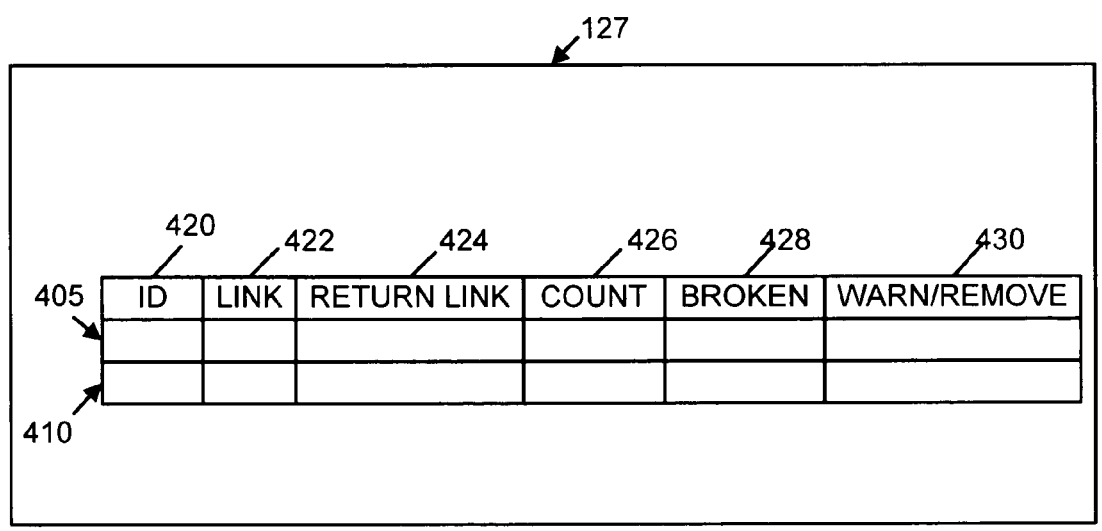
FIG. 4 depicts a block diagram of an example data structure for link data, according to an embodiment of the invention.

FIG. 4 depicts a block diagram of an example data structure for the link data 127, according to an embodiment of the invention. The link data 127 includes records 405 and 410, but in other embodiments any number of records with any appropriate data may be present. Each record includes a number of fields, such as an identifier field 420, a link field 422, a return link field 424, a count field 426, a broken field 428, and a warn/remove field 430. The identifier field 420 is created by the controller 126 to uniquely identify the section 214. The link field 422 contains the link 130 to the reciprocal site 160. In an embodiment, the controller 126 uses the link field 422 to verify that the reciprocal page 162 is reachable from the main page of the reciprocal site 160.

The return link field 424 contains a link to the reciprocal page 162 where the reciprocal link 164 is to be found. The count field 426 indicates the number of times the reciprocal link 164 has not been found, i.e., the number of times the controller 126 has detected that the reciprocal link 164 is broken or missing. The broken field 428 indicates whether or not the reciprocal link is currently not found, broken, or missing. The warn/remove field 430 identifies indicates the user selection of either the warn option 305 or the remove option 310.

Figure 5:
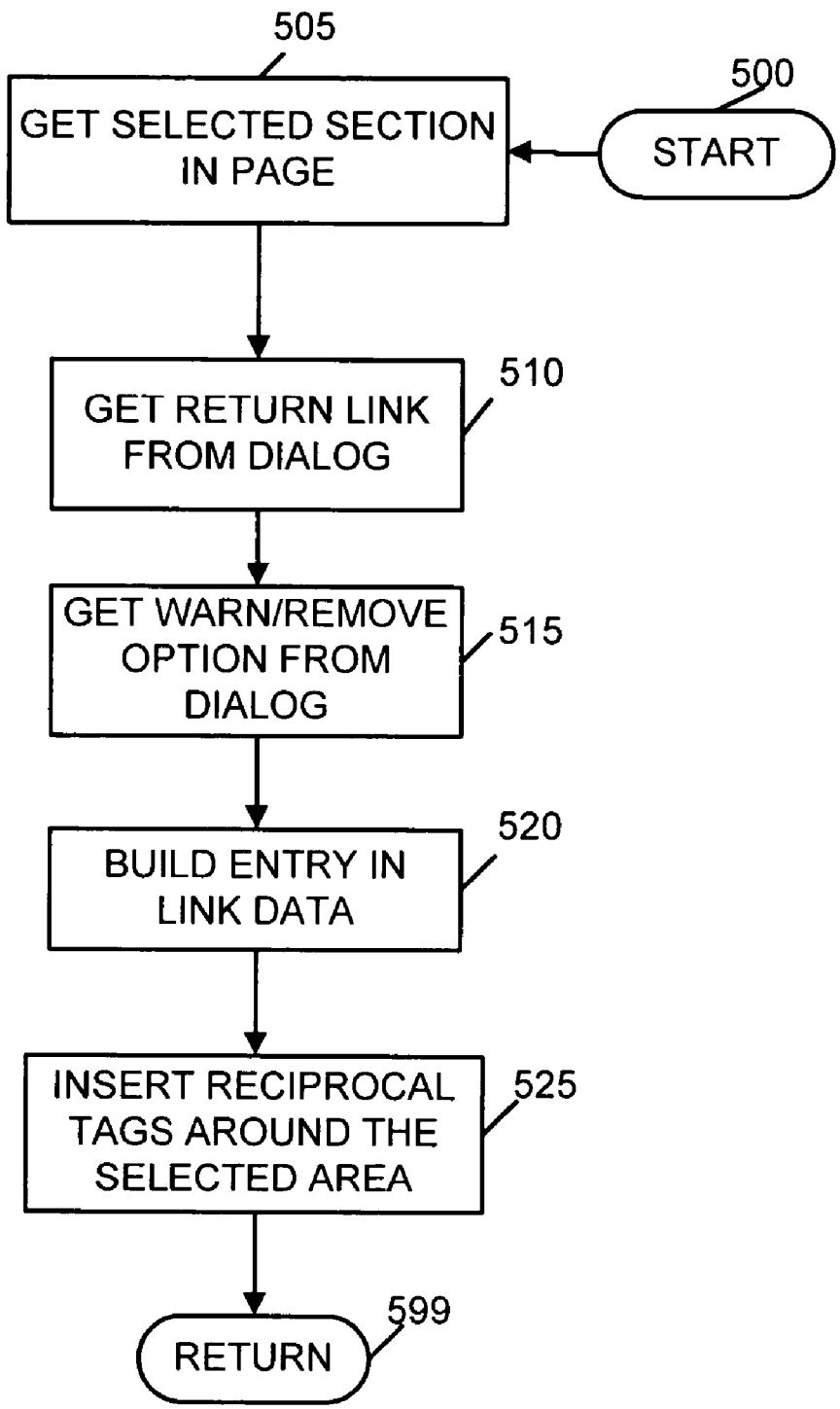
FIG. 5 depicts a flowchart of example processing for editing reciprocal links, according to an embodiment of the invention.

FIG. 5 depicts a flowchart of example processing for responding to an edit reciprocal links command 220, according to an embodiment of the invention. Control begins at block 500. Control then continues to block 505 where the controller 126 determines the user-selected section 214 in the displayed rendering 210 of the page 128. Control then continues to block 510 where the controller 126 gets the return link 320 from the dialog 300. Control then continues to block 515 where the controller gets the warn option 305 or the remove option 310 from the dialog 300, depending on which option the user selected via the input device 120.

Control then continues to block 520 where the controller 126 builds a new record (such as record 405 or 410) in the link data 127 for the selected section 214. The controller 126 creates a section identifier that identifies the section 214 and stores the section identifier in the identifier 420 of the new record. The controller 126 stores the link 130 to the reciprocal site 160 in the link 422 of the new record. The controller 126 stores the return link 320 in the return link 424 of the new record. The controller 126 initializes the count 426 in the new record to zero and initializes the broken field 428 in the new record to indicate that the return link 424 is not broken. The controller 126 sets the warn/remove 430 to indicate either the warn option 305 or the remove option 310, as selected by the user in the dialog 300.

Control then continues to block 525 where the controller 126 inserts the reciprocal tags 260-1 and 260-2 surrounding the link 130 in the page 128. The reciprocal tags 260-1 and 260-2 include or surround the section identifier 420. In the example shown in FIG. 2B, the section identifier is "4."

Control then continues to block 599 where the function returns.

Figure 6:
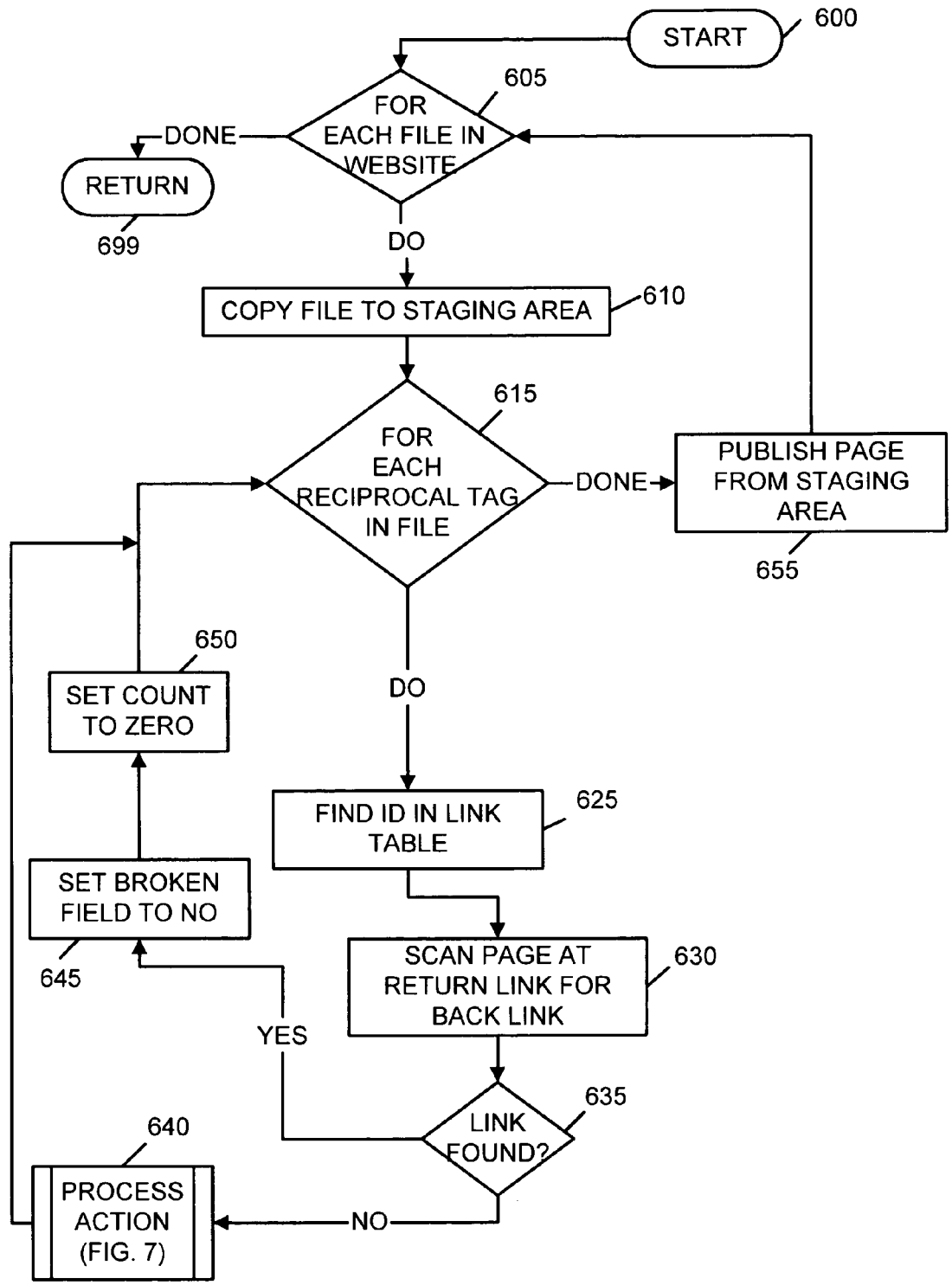
FIG. 6 depicts a flowchart of example processing for publishing a page, according to an embodiment of the invention.

FIG. 6 depicts a flowchart of example processing for publishing the page 128, according to an embodiment of the invention. Control begins at block 600. Control then continues to block 605 where the controller 126 begins a loop processing each file associated with a website. A website may include multiple files containing pages, such as the page 128. After all pages at the website have been processed, control continues from block 605 to block 699 where the controller 126 returns.

While files remain to be processed, control continues from block 605 to block 610 where the controller 126 copies the file to a staging area in the storage device 115, where the controller 126 may modify the page 128. Control then continues to block 615 where the controller 126 enters a loop that processes each reciprocal tag in the current page 128. So long as the page 128 contains more unprocessed reciprocal tags 260-1 and 260-2, control continues from block 615 to block 625 where the controller 126 uses the section identifier contained in the reciprocal tags 260-1 and 260-2 to find the appropriate record in the link data 127 via the identifier field 420.

Control then continues to block 630 where the controller 126 uses the return link 424 to find and retrieve the reciprocal page 162. The controller 126 then scans the reciprocal page 162, searching for the reciprocal link 164 that matches the address 205, i.e., that links to the page 128.

Control then continues to block 635 where the controller 126 determines whether a matching link was found in block 630. If the determination at block 635 is true, then control continues to block 645 where the controller 126 sets the broken field 428 to indicate that the reciprocal link 164 is not broken. Control then continues to block 650 where the controller 126 sets the count 426 to zero. Control then returns to block 615 as previously described above.

If the determination at block 635 is false, then control continues to block 640 where the controller 126 processes the broken reciprocal link as further described below with reference to FIG. 7. Control then returns to block 615 as previously described above.

When the page 128 no longer contains unprocessed reciprocal tags at block 615, control then continues from block 615 to block 655 where the controller 126 publishes the page 128 from the staging area, which makes the page 128 available to other authorized electronic devices connected to the electronic device 102 via the network 105. Control then returns to block 605, as previously described above.

Figure 7:
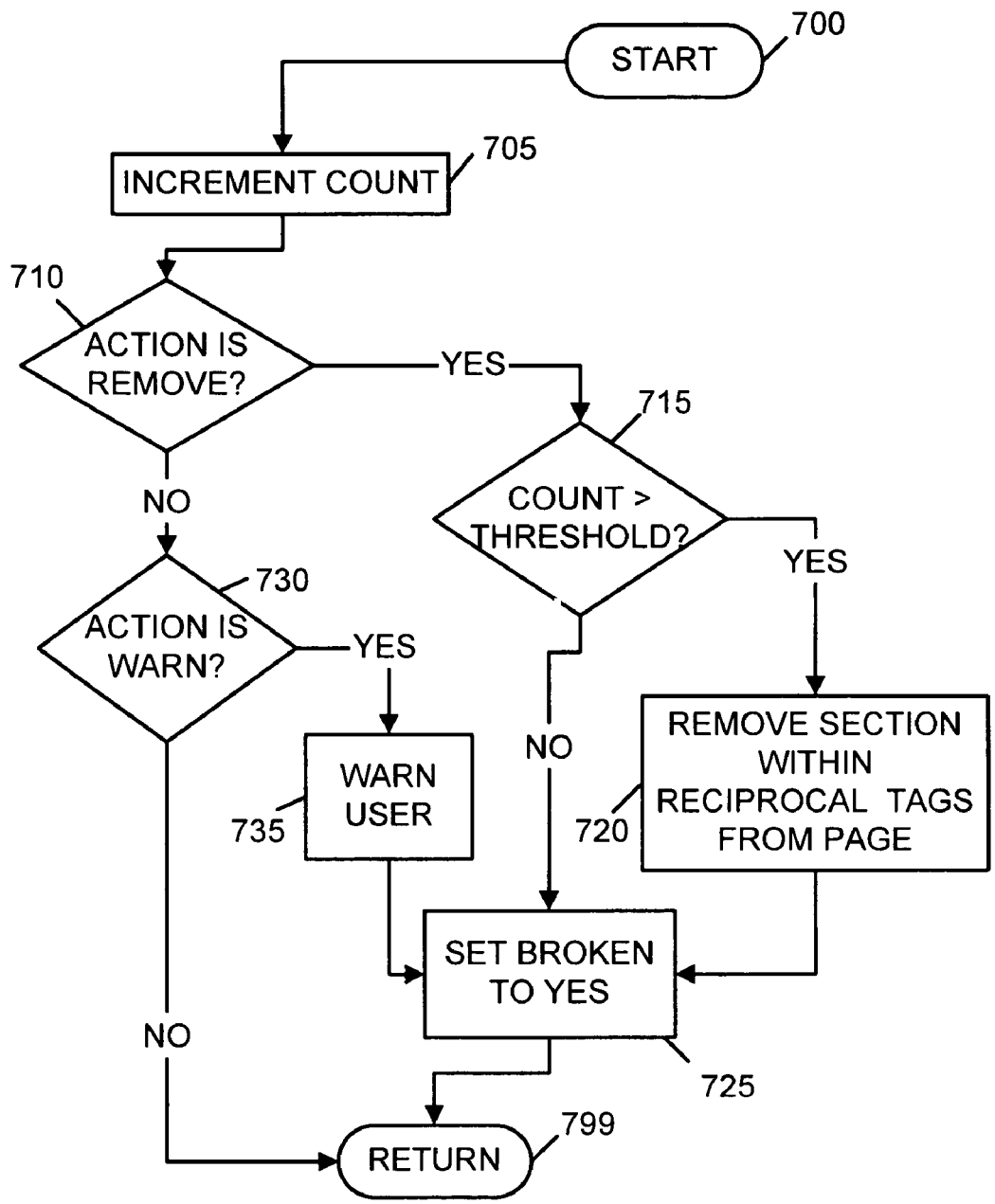
FIG. 7 depicts a flowchart of example processing for handling a broken reciprocal link, according to an embodiment of the invention.

FIG. 7 depicts a flowchart of example processing for handling a broken reciprocal link, according to an embodiment of the invention. Control begins at block 700. Control then continues to block 705 where the controller 126 increments the count 426, indicating the number of times that the reciprocal link has been detected to be broken.

Control then continues to block 710 where the controller 126 determines whether the warn/remove field 430 indicates that the selected action upon detecting a broken link is to remove the link 130 from the page 128. If the determination at block 710 is true, then control continues to block 715 where the controller 126 determines whether the count 426 is greater than a threshold. In another embodiment, the controller 126 keeps track of the amount of time that the link has been broken and determines whether the amount of time exceeds a threshold.

If the determination at block 715 is true, then control continues to block 720 where the controller 126 removes the link 130, which is between the reciprocal tags in the current section 214, from the page 128. Control then continues to block 725 where the controller 126 sets the broken field 428 to indicate that the reciprocal link 164 is broken. Control then continues to block 799 where the function returns.

If the determination at block 715 is false, then control continues to block 725 where the controller 126 sets the broken field 428 to indicate that the reciprocal link 164 is broken. Control then continues to block 799 where function returns.

If the determination at block 710 is false, then control continues to block 730 where the controller 126 determines whether the warn/remove field 430 indicates that the selected action upon detecting a broken link is to warn the user. If the determination at block 730 is true, then control continues to block 735 where the controller 126 warns the user, e.g., via a message on the output device 122 or via an email. The user may then take any appropriate action. Control then continues to block 725 where the controller 126 sets the broken field 428 to indicate that the reciprocal link 164 is broken. Control then continues to block 799 where the function returns.

If the determination at block 730 is false, then control continues to block 799 where the function returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
   receiving an edit reciprocal link option and a selected section of a first page from a user interface;
   adding at least one reciprocal tag to the first page based on the edit reciprocal link option and the selected section of the first page, wherein a first link to a reciprocal site is in the selected section, and wherein the at least one reciprocal tag identifies the selected section that includes the first link;
   finding the at least one reciprocal tag in the first page;
   finding a reciprocal page based on the at least one reciprocal tag, wherein the reciprocal page is at the reciprocal site, wherein the finding further comprises finding a record based on the reciprocal tag that identifies the reciprocal page;
   determining whether a reciprocal link exists in the reciprocal page to the first page; and
   if the reciprocal link does not exist, determining an action based on a user-interface option.

2. The method of claim 1, further comprising:
   if the reciprocal link does not exist, issuing a warning.

3. The method of claim 1, further comprising:
   if the reciprocal link does not exist, removing the first link from the first page.

4. An apparatus including a processor comprising:
   receiving unit for receiving an edit reciprocal link option and a selected section of a first page from a user interface;
   adding unit for adding at least one reciprocal tag to the first page based on the edit reciprocal link option and the selected section of the first page, wherein a first link to a reciprocal site is in the selected section, and wherein the at least one reciprocal tag identifies the selected section that includes the first link;
   reciprocal tag finding unit for finding the at least one reciprocal tag in the first page;
   reciprocal page finding unit for finding a reciprocal page based on the at least one reciprocal tag, wherein the reciprocal page is at the reciprocal site, wherein the finding further comprises finding a record based on the reciprocal tag that identifies the reciprocal page;
   reciprocal link determination unit for determining whether a reciprocal link exists in the reciprocal page to the first page; and
   action determination unit for determining an action based on a user-interface option if the reciprocal link does not exist.

5. The apparatus of claim 4, further comprising:
   warning unit for issuing a warning if the reciprocal link does not exist.

6. The apparatus of claim 4, further comprising:
   removing unit for removing the first link from the first page if the reciprocal link does not exist.

7. The apparatus of claim 4, further comprising:
   removing unit for removing the first link from the first page if the reciprocal link does not exist and a number of times the reciprocal link has not existed exceeds a threshold.

8. A storage medium encoded with instructions, wherein the instructions when executed comprise:
   receiving an edit reciprocal link option and a selected section of a first page from a user interface;
   adding at least one reciprocal tag to the first page based on the edit reciprocal link option and the selected section of the first page, wherein a first link to a reciprocal site is in the selected section, and wherein the at least one reciprocal tag identifies the selected section that includes the first link;
   finding the at least one reciprocal tag in the first page;
   finding a reciprocal page based on the at least one reciprocal tag, wherein the reciprocal page is at the reciprocal site, wherein the finding further comprises finding a record based on the reciprocal tag that identifies the reciprocal page;
   determining whether a reciprocal link exists in the reciprocal page to the first page; and
   determining an action based on a user-interface option if the reciprocal link does not exist.

9. The storage medium of claim 8, further comprising:
   issuing a warning if the reciprocal link does not exist.

10. The storage medium of claim 8, further comprising:
    removing the first link from the first page if the reciprocal link does not exist.

11. The storage medium of claim 8, further comprising:
    removing the first link from the first page if the reciprocal link does not exist and a number of times the reciprocal link has not existed exceeds a threshold.

12. The storage medium of claim 8, further comprising:
removing the first link from the first page if the reciprocal link does not exist and a length, of time that the reciprocal link has not existed exceeds a threshold.

13. A server comprising:
a processor; and
a storage device encoded with instructions, wherein the instructions when executed on the processor comprise:
receiving an edit reciprocal link option and a selected section of a first page from a user interface,
adding at least one reciprocal tag to the first page based on the edit reciprocal link option and the selected section of the first page, wherein a first link to a reciprocal site is in the selected section, and wherein the at least one reciprocal tag identifies the selected section that includes the first link,
finding the at least one reciprocal tag in the first page,
finding a reciprocal page based on the at least one reciprocal tag, wherein the reciprocal page is at the reciprocal site, wherein the finding further comprises finding a record based on the reciprocal tag that identifies the reciprocal page,
determining whether a reciprocal link exists in the reciprocal page to the first page, and
if the reciprocal link does not exist, determining an action based on a user-interface option.

14. The server of claim 13, wherein the action further comprises:
issuing a warning if the reciprocal link does not exist.

15. The server of claim 13, wherein the action further comprises:
removing the first link from the first page if the reciprocal link does not exist.

16. The server of claim 13, wherein the action further comprises:
removing the first link from the first page if the reciprocal link does not exist and a number of times the reciprocal link has not existed exceeds a threshold.

17. The server of claim 13, wherein the action further comprises:
removing the first link from the first page if the reciprocal link does not exist and a length of time that the reciprocal link has not existed exceeds a threshold.

* * * * *